United States Patent [19]

O'Meara

[11] 4,011,445
[45] Mar. 8, 1977

[54] OPTICAL ARRAY ACTIVE RADAR IMAGING TECHNIQUE

[75] Inventor: Thomas R. O'Meara, Malibu, Calif.

[73] Assignee: Hughes Aircraft Company, Culver City, Calif.

[22] Filed: Dec. 16, 1975

[21] Appl. No.: 641,330

[52] U.S. Cl. .............................. 250/199; 325/474; 343/5 R; 356/4; 356/28; 356/114

[51] Int. Cl.² ......................................... H04B 9/00

[58] Field of Search .......... 350/153; 325/369, 371, 325/474, 475, 476; 356/1, 4, 5, 2, 28, 114; 250/199

[56] References Cited

UNITED STATES PATENTS

| 3,403,394 | 9/1968 | Rouault | 343/5 |
| 3,576,371 | 4/1971 | Ulicki | 356/4 |

*Primary Examiner*—Robert L. Richardson
*Attorney, Agent, or Firm*—M. E. Gerry; W. H. MacAllister, Jr.

[57] ABSTRACT

An optical target imaging system having a laser transmitter that provides a dual pulse sequence target illuminating field. One pulse of the dual pulse field is predominantly polarized in one direction and the other pulse is predominantly orthogonally polarized. At least two receivers for receiving the energy reflected from target in a predetermined polarization state processes the target information. Ultimately, the receiver outputs providing sample signals in Fourier or like transform format are fed to a digital computer that inverse transforms such signals to generate an image. A visual display of the target or data comprising display information is made possible by feeding the computer output into a CRT system or a data recording terminal.

23 Claims, 7 Drawing Figures

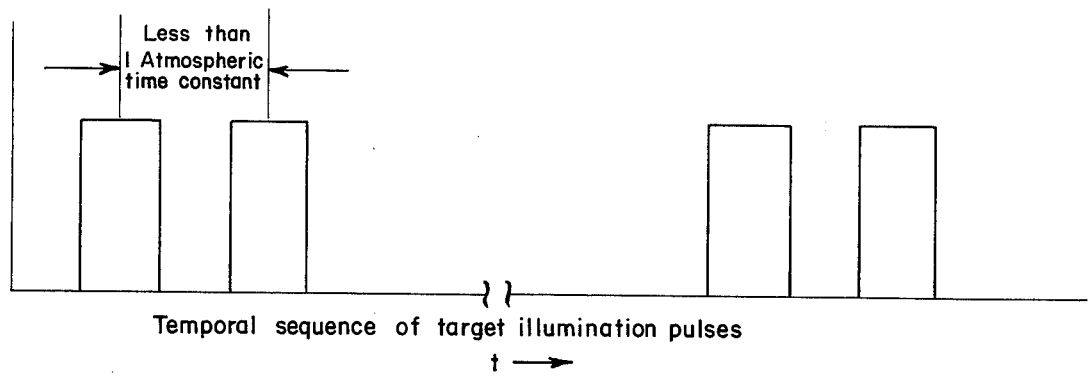
Fig. 1b.
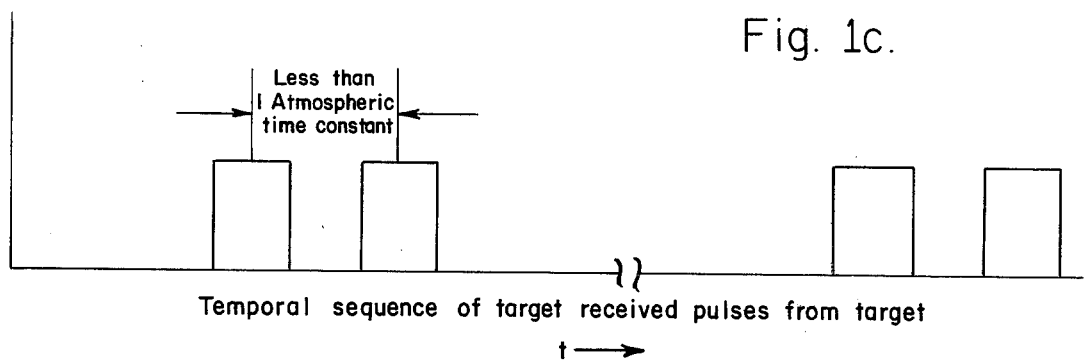
Fig. 1c.
Fig. 4.
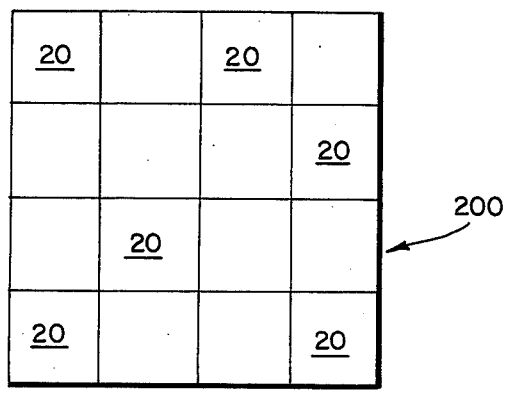

OPTICAL ARRAY ACTIVE RADAR IMAGING TECHNIQUE

BACKGROUND OF THE INVENTION

This invention is in the field of receivers in the infra-red and optical frequencies, and particularly those receivers involving high resolution imagery.

Such receivers are generally utilized in detecting objects in space in regions above the turbulent boundary layer which is localized near the surface of the earth.

In conventional imaging techniques, the angular resolution capability at infra-red and optical wavelengths is limited by atmospheric turbulence to angles approximately in excess of two arc seconds irrespective of the size of the imaging optics.

Prior art systems consist in part of conventional infrared and optical imaging networks wherein an image is formed by means of a combination of refracting or reflecting lens systems. These systems suffer the disadvantage that they are significantly affected by atmospheric turbulence.

Other prior art systems also suffer from limited detection capabilities due to use of passive radiation from the object sought to be detected.

Further, prior art systems suffer the disadvantage that only limited apertures may be employed, since the problem of maintaining wavelength-type optical precisions in large baseline optical arrays has been overwhelmingly difficult.

No optical system is known which employs samples of an optical received field returned from a target with computer processing of these samples to generate an image of the target.

No system is known that utilizes the dual polarization technique of the transmitter portion, nor the specific receiver portions of the system set to a predetermined polarization state or the hardware components thereof.

SUMMARY OF THE INVENTION

An objective of this invention therefore is to provide a technique so as to enable an increase in image resolution of objects to substantially smaller than the two arc second limit imposed by atmospheric turbulence.

Still another objective is to provide a technique whereby very large baseline optical imaging systems up to at least several kilometers in diameter can be constructed with reasonable mechanical tolerances.

Yet a further objective is to provide a system that permits improved signal-to-noise ratio images by virtue of an active illumination, and will preserve phase information in the signals throughout the inventive system, permitting an accurate computation of the images.

Briefly, according to this invention, the technique disclosed here is partly based on the fact that when a scatterer is illuminated by a polarized wave, the energy scattered with the incident polarization is predominately specular in nature and therefore orignates from a localized region on the scatterer such as glints, whereas the depolarized scattered energy is associated with diffuse scattering and therefore is representative of the majority of the image area of the scatterer. This means that the nondepolarized return from the glint or glints can serve as a reference which substantially calibrates the atmospheric path and system phasing errors, and thereby permits them to be removed.

An optical system is shown here which employs this calibration process and which constructs an image based on samples of the received optical field, as translated to electrical signals, in the outputs of optical heterodyne receivers. The image is obtained by sampling these electrical signals and operating on the samples with a numerical Fourier transform process in a digital computer. This same computer aids in calibrating the system and removes the measured phase errors.

The calibration or reference information and the image information are extracted by appropriately coding the illuminating field in a two-pulse sequence — one pulse linearly polarized and the other also linearly polarized, but orthogonally to the first. The first pulse extracts the image information and the second extracts the reference or calibration information. Most commonly, the cross-polarized pulse returns (first pulse) would be stored in the computer as complex fields samples from the $n^{th}$ receiver $I_n$ and the non-depolarized returns (second pulse) at each receiver would be stored as a complex field reference $R_n$. The computer may then be used to generate a set of numbers which represent the corrected source far field samples $\bar{I}_n$, by multiplying the image samples by the complex conjugate of the reference samples. Thus, $\bar{I}_n = I_N R_n^* = I_n/R_n$, where $R_n^*$ is the complex conjugate form of $R_n$. This function is performed external to the computer by either a digital divider solving $I_n/R_n$ or a digital multiplier solving $I_n R_n^*$, freeing the computer from having to perform such divison.

For an ideal single glint reference this is equivalent to subtracting the common path atmospheric or position phase errors, providing the two pulse sequence is accomplished within one atmospheric time constant, that is, the shortest period of temporal variation in the phasing errors.

Briefly, the method for imaging targets through turbulent atmosphere used in this invention may be summarized by first illuminating at least one of said targets with an encoded electromagnetic wave containing a predetermined pulse sequence. Then a received portion of the wave reflected from at least one of said targets is sampled.

The received samples are then converted to electrical signals, wherein the phase and amplitude characteristics of the received samples are preserved. Analog-to-digital converters are used for changing the form of the preserved samples.

A two-dimensional array of complex numbers corresponding to and represented by the analog-to-digitally converted preserved samples is formed. This array is then operationally transformed into another two-dimensional array of complex numbers. The complex numbers are in direct Fourier transform format. A two-dimensional array of real numbers by inverse transformation of the direct Fourier transform format from said another two-dimensional array of complex numbers, is then generated.

A two-dimensional picture is displayed as obtained from the generated two-dimensional array of said real numbers to provide a visual display of the target.

It should be noted that the received sampled portions are fed to a plurality of receiver through an independent receiving telescope associated with each said receiver, in one instance. In another instance the received sampled portions are fed to a plurality of receivers through a common receiving telescope that feeds all said receivers.

It should also be noted that grating lobes associated with the telescope array are controlled by spacing the receiving telescopes a predetermined distance from each other so as to miss the edges of any of the targets; this is accomplished in the situation where a receiving telescope is employed with and feeds each receiver.

BRIEF DESCRIPTION OF THE DRAWINGS

FIGS. 1b and 1c are functional representatives of the two pulse transmitted and received optical intensity signals respectively as functions of time.

FIG. 2 is an array pattern sampling function of the receiving systems as illustrated in FIGS. 1–1a.

FIG. 4 shows a matrix of receiving systems each of which has been detailed in FIGS. 1–1a or broadly shown in FIG. 3.

DETAILED DESCRIPTION

Figure 1:
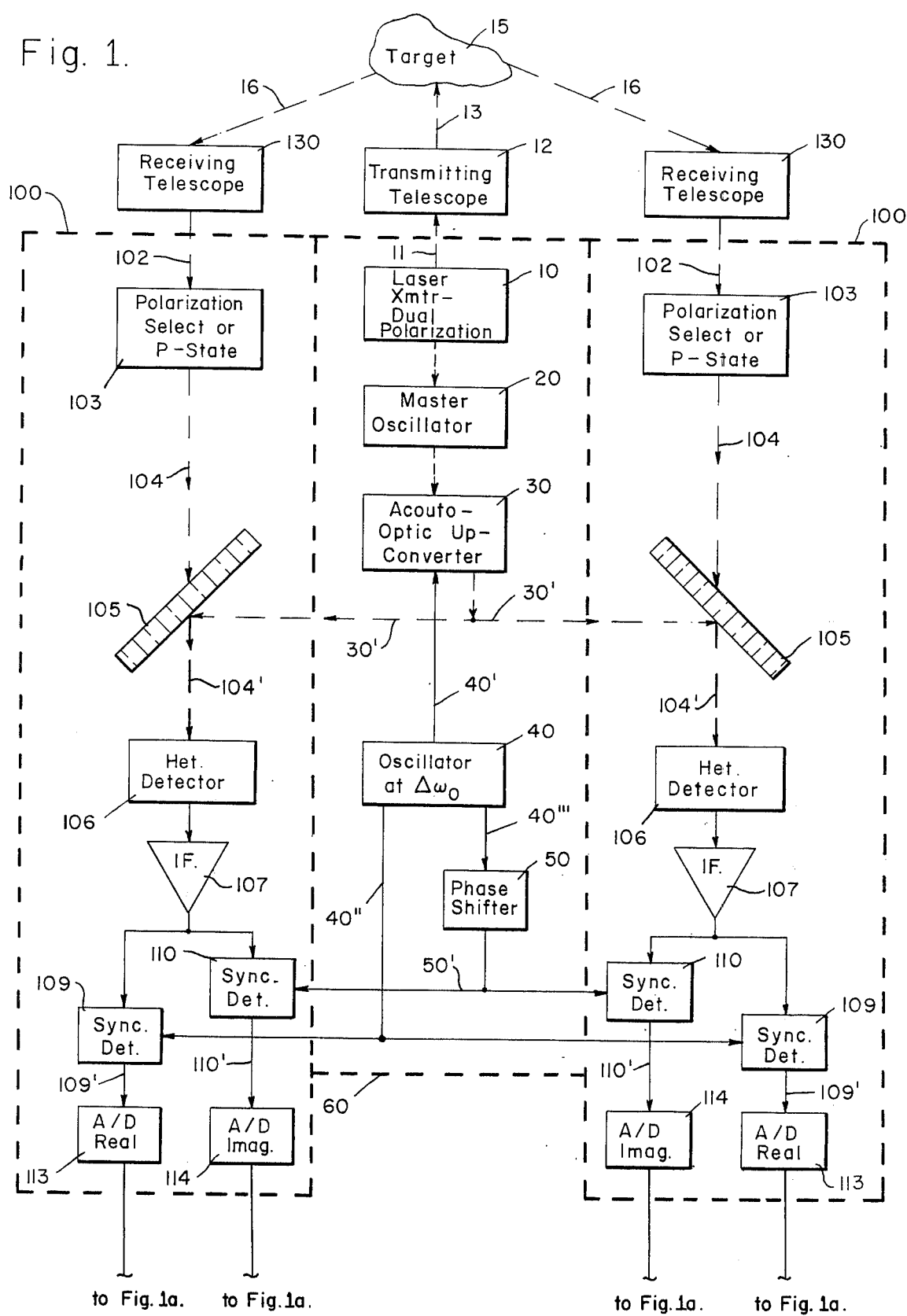
FIG. 1 is a system schematic in accordance with this invention.
Figure 1A:
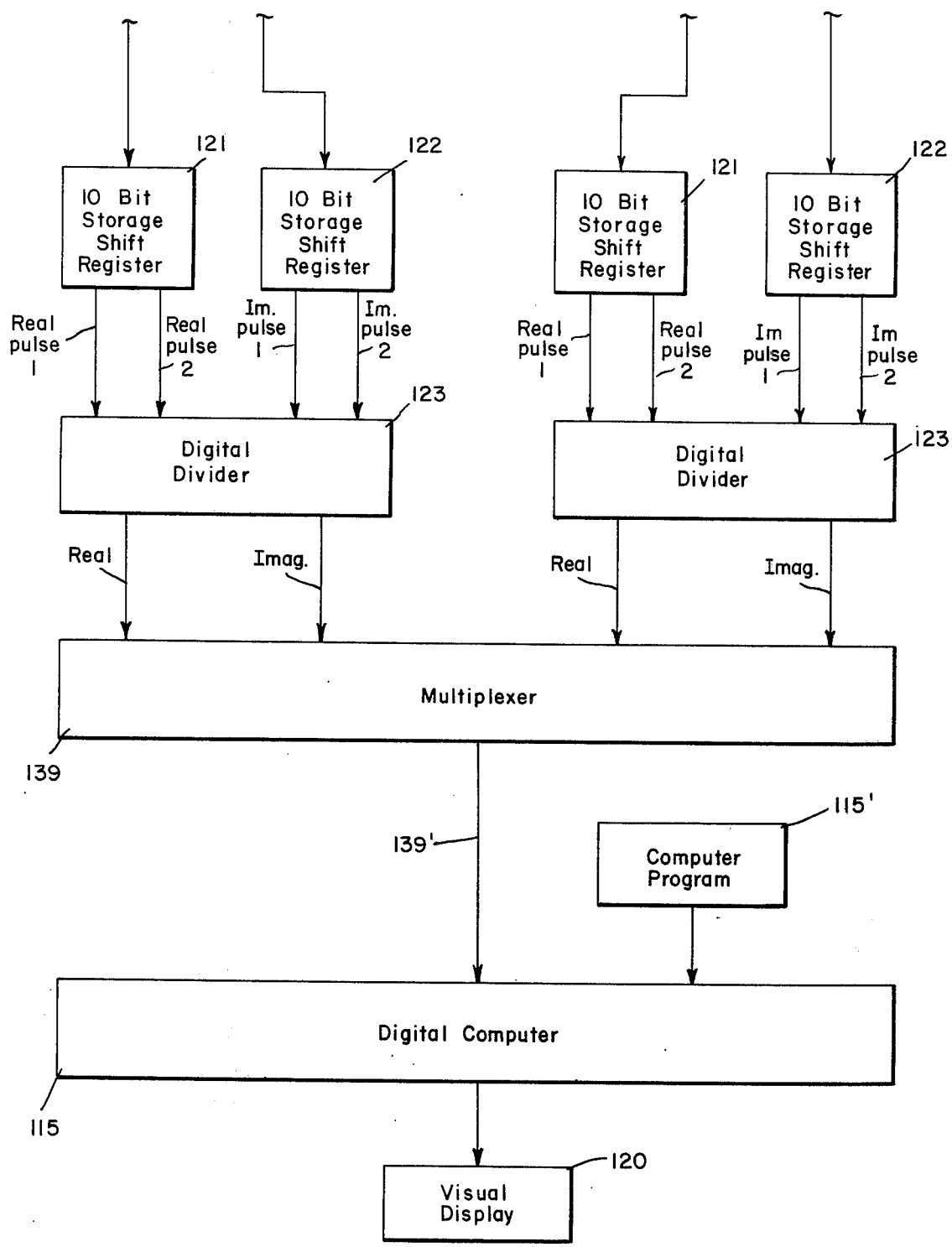
FIG. 1a is a continuation of the system schematic of FIG. 1.

The operation of the system may be best understood by referring to FIGS. 1 and 1a.

Laser transmitter 10 transmits a two pulse burst via path 11, through telescope 12 and via path 13 to target 15. The first pulse is in the S-state (vertically polarized), the second pulse is in the P-state (horizontally polarized), and is separated in time from the first pulse by a period representative of less than one atmospheric time constant. The frequency of this transmitter is controlled by master oscillator 20. This master oscillator is also coupled to up converter 30, which in this instance may be an acousto-optic up converter. The optical signals are shifted in frequency in the up converter 30 by an amount $\Delta\omega_o$ with respect to frequency of oscillator 20. The amount of frequency offset $\Delta\omega_o$ of oscillator 40 determines the acoustical frequency in acousto-optic up converter 30. These optical shifted signals are distributed from up converter 30 to the several receivers 100, via distribution paths or optical cables 30', which may be fiber optic cables, wherein the signals serve as a local oscillator source. Electrical signals at frequency $\Delta\omega_o$ are also delivered to receivers 100 both directly to synchronous detectors 109 and distribution line 40''' to energize 90° phase shifter 50 which via distribution line 40'' delivers phase shifted signals via cables 50' to synchronous detectors 110. Oscillator 40 also energized up converter 30 via cable 40'.

Referring to FIGS. 1b and 1c, the two pulse laser radiation components delivered to transmitting telescope 12 are directed to and generally focus upon target 15, which is to be imaged. However the focusing must not be sufficiently sharp that the target fails to be substantially uniformly illuminated. The first pulse is reflected from the extended diffusely scattering portions of the target to generate the image samples in receiving systems 100. Propagation paths 16 are generally distorted by atmospheric turbulence such that phase errors are introduced into the far field samples. The second pulse generally more horizontally polarized (P-state) is strongly reflected from the glint due to scatter effect of light on target resulting in glint regions, and such pulse regions of the target from which the glint regions generate a reference field at receiving systems 100 with substantially the same atmospheric or propagation phasing errors as in the first pulse since path 16, remains substantially the same. As seen in FIG. 1c, both the first and second of the series of two pulse groups are received by receiving system 100 with substantially the same separation time therebetween except that the received amplitude will be smaller than the transmitting amplitude of the pulses with some delay of the received pulses with respect to the transmit pulses.

Two pulses are utilized so that both the field and reference signals may be selected by a single polarization selector operating with a single detector such as detector 106.

Referring again to FIGS. 1 and 1a, each receiving system 100 has a receiving telescope 130 associated therewith and pointed at the target, the telescope at 130 having the function of capturing photons returning from the target by virtue of its large collecting area. Polarization selector is provided at 103 for passing the P-polarization state inhibiting the S-polarization state of both the first and second pulses as shown in FIGS. 1a and 1b. It is again pointed out that S (vertically polarized) states of energy and P (horizontally polarized) states of energy are received by polarization selectors 103 but only the P state is passed thereby, the S state being specified, so that only the P state is available at 104. Means such as beam splitters 105 receive optical signals 104 from selectors 103. Signals at 30' outputted by up converter 30 impinge on face of beam splitters 105 and match wavefronts with signal 104 to result in signal at 104'. Hence optical signals at 104 and 30', will, as represented at 104', be inputted to heterodyne detectors 106. These optical signals are thus converted by detectors 106 to an intermediate frequency signal. The IF frequency will be the difference between oscillator 20 frequency and up converter 30 frequency outputs.

At substantial signal levels, the output of each amplifier 107 is synchronously detected by detectors 109 and 110, which because of outputs 40'' from oscillator 40 inputted to detectors 109, and because of outputs 50' from phase shifter 50, provide signals having arguments sin $\Delta\omega_o t$ and cos $\Delta\omega_o t$, to beat against IF amplifier outputs and provide low pass quadrature components which have real and imaginary parts at 109' and 110' respectively of the signal, termed $R_n$ and $I_n$. The signals at 109' and 110' are A/D converted by converters 113 and 114 respectively, and transmitted to computer 115 having a suitable program 115' inputted to computer 115. Converters 113 pass the real components of the complex signal, whereas converters 114 pass the imaginary components of such signal to the computer input. Computer program is for example in FORTRAN IV language inputted to IBM Model 360 computer shown at 115. The corrected samples $\tilde{I}_n$ are then Fourier inverse-transformed in computer 115 to generate the image obtained from target 15 which may be displayed on a CRT display or recorded at a data recording terminal as at 120.

Real components are passed from A/D converters 113, containing five bit words for each component representing the real parts of the first and second pulses as shown graphically in FIG. 1c, into 10 bit storage and shift register 121. Likewise, imaginary components are formed from A/D converters 114, containing five bit words for each component representing the imaginary parts of the first and second pulses as shown graphically in FIG. 1c, into 10 bit storage and shift registers 122. It is noted that the spacing in terms of time between the first and second pulses allows each of the first and second pulses to be stored at separate locations in shift registers 121 and 122. The words are required to be stored in the registers so that they may then be transmitted to digital dividers 123. Each digital divider then performs division of the complex numbers representing the two stored words to obtain a ratio in complex terminology of these words so that only a complex number representing each ratio in terms of a single real or imaginary component is presented as an input to multiplexer 139.

Though the operation of the digital divider is old in the art, for example being used in such digital calculators as Hewlett-Packard Model 45, or shown at pages 15-5 and 15-6 of *Computer Handbook* by Huskey and Korn, 1st Edition, 1962, McGraw Hill, N.Y., or at pages 317–318 of the textbook *Computer Hardware Theory* by Poppelbaum, 1972, published by the MacMillan Company, N. Y., a brief example of the mathematical manipulation is herein shown for providing better understanding.

We shall refer to the components of the first pulse as A and the components of the second pulse as B. Each of these components has a real and imaginary part so that pulse A may be stated in its complex form as Re A + $i$ Im A, and pulse B may be similarly stated as Re B + $i$ Im B, which when injected into divider becomes $$\frac{Re\ A + i\ Im\ A}{Re\ B + i\ Im\ B},$$

and when rationalized by multiplying through by the complex conjugate of the denominator we obtain only a single real and imaginary component presented as input to multiplexer 139. As stated above outputs from multiplexer 139, representing each composite real and imaginary component fed by digital divider 123 for each receiver 100 is inputted to computer 115 for processing, utilizing the aforesaid computer 115 and computer program 115′.

It is to be noted that all dotted lines represent optical coupling and solid line hard wire or electrical cable interconnections.

Figure 2:
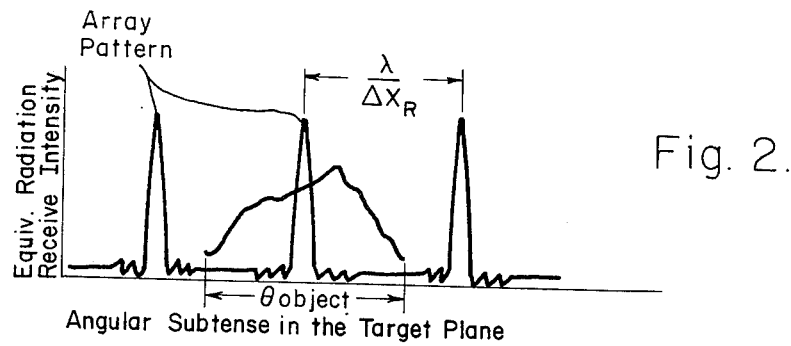

With reference to FIG. 2 there is a further restriction on the elemental receiver spacing, $\Delta X_R$. Shown graphically is the array pattern from a regular array sampling of receiving systems as at 100 spaced by $\Delta x_R$ superposed on the object. To keep the grating lobes of the regular array from overlapping the target, the spacing must satisfy the relationship:

$$\Delta x_R < \frac{\lambda}{\theta_{object}},$$

if an unambiguous image is to be obtained. In the latter expression, $\lambda$ is the wavelength of the illumination laser 10 and $\theta_{object}$ is the angular extent of target 15. Some relief from the restriction may be obtained by using nonregular arrays but only at the expense of some deterioration in image quality.

Figure 3:
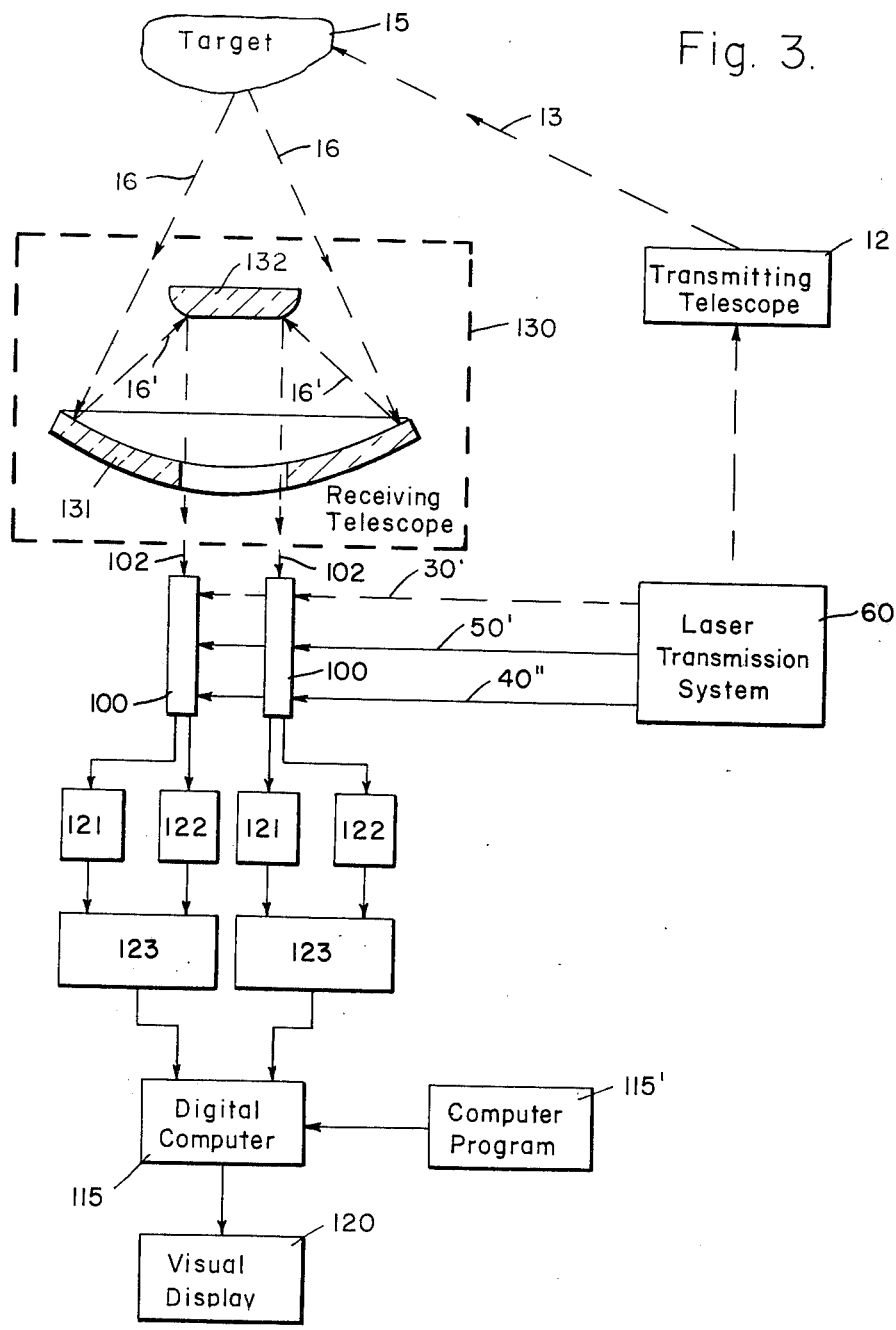
FIG. 3 shows the same system is schematic form to that of FIGS. 1–1a except that a common receiving telescope is used to feed all the receiving systems.

With reference to FIG. 3, this figure is substantially the same system as that of FIGS. 1 and 1a, except that only a single receiving telescope at 130 is used to feed all the receivers at 100. Although only two receivers have been illustrated, it is understood that any number of receivers may be used in both FIGS. 1–1a and 3 configurations.

Unlike FIGS. 1–1a, where each receiver 100 has a separate telescope 130, wherein each such separate telescope has to be trained to face and look upon entire extent of target 15, a single telescope as at 130 is used with the multiple receivers 100, shown in FIG. 3. Telescope 130 will be pointing and looking at entire target 15, such telescope receivers reflected energy as at 16 from the target. Likewise, transmitting telescope 12 will be illuminating by means of beam 13, such entire target 15 with such laser beam produced by transmission system 60 so that it will be possible to receive the reflected energy as at 16.

Details of one possible receiving telescope have been shown comprising a primary mirror or reflector at 131 upon which beam 16 impinges and from which the reflected component 16′ impinges upon secondary mirror 132 to be reflected therefrom as beams 102 for feeding polarization selectors 103. Otherwise sufficient block diagram schematics are shown of the transmitter system, its coupling to receivers 100 to show that the system of FIG. 3 is the same as the system of FIGS. 1–1a. Also shown for completeness is the outputs of receivers 100, shift registers 121 and 122, digital dividers 123 connected to computer 115, the visual display 120 and computer program interconnection with computer 115.

Referring to FIGS. 1–1a, 3 and 4, a matrix of receiving systems 20 are shown at 200. Though matrix 200 is shown for illustration purposes as a 4×4 array of receiving systems 20, such array may be of the $n \times m$ matrix where $n$ and $m$ are any digits representing the number of rows and columns of receiving systems 20 desired, or the array does not have to be structured in rows and columns since the received images from each system 20 are the total images representing the target with different weighting factors.

Each receiving system 20 is comprised of optical sensor or telescope 130, receiver 100, and A/D converters 113 and 114 feeding shift registers 121 and 122 which in turn feed digital divider 123. A common multiplexer 139 for switching between receiving systems 20 is used. Digital computer 115 receives outputs at 139′ from the common multiplexer in a predetermined sequence until all outputs of receiving systems 20 have been inputted to computer 115 to process the real and imaginary components that have been A/D converted by each converter 113–114, stored at 121 and 122 and components thereof divided at 123 and computer 115 inverse transforms the digital signals to obtain the spatial distribution on display 120 of the image field of target 15 from which the image is obtained.

Transmitter 60, generally of the laser type, provides an optical output at 11 to transmitting telescope 12. Telescope 12 has a lens 12′ through which the transmitted beam 11 passes as beam 13, to fully illuminate a target at 15 of a preselected area. Generally the characteristics of a laser beam are spatially and temporally coherent. There is very little beam 11 divergence or spread. Since it is desired to illuminate an entire target area most of the time, a lens as at 12′ will be provided to spread or diverge the beam more than its natural spread angle to enable full target illumination of preselected target areas. The transmitter system will provide target illumination beam 11 consisting of the two pulses as shown in FIG. 1b and discussed above.

Each of beams 16 will therefore be reflected from target 15 to impinge on the face of each receiving telescope 130 trained to see the entire target, for each receiving system 20. Beams 16 will contain optical components of beams 11 or 13, which may be defined as polarized energy and cross-polarized energy having S and P, states, the latter energy state due to diffuse scattering of energy occurring at the face of the target. Each system 20 will then function as described in conjunction with FIGS. 1–1a, 1c and generally as described in conjunction with FIG. 3 above.

It should be noted that spacing between target 10 and telescopes 101 may be in the order of 40,000 kilometers, and thus fields represented by beams 16 may be considered as far-fields since the receiving telescopes are a substantial distance from the target or scatterer 15. It is well recognized in the art of electromagnetic theory that such far-fields received at 130 is more exactly expressed in the terms of the direct Fourier transform as a function of spatial separation from the scatter and the receivers. When the multiplexed signal at 139' containing the real and imaginary component pairs are handled by computer 155 such computer inverse transforms these signal pairs from the complex domain. Such inverse Fourier transformed signals at 115a are applied to the Z or intensity axis of CRT display 120 to reconstruct the configuration of target 15 by evaluating the weighting factors of different shades of white, black or gray seen by each system 20.

The far-field at the input of each receiving system may be conveniently expressed in complex form (direct Fourier transform). Integration over total surface of target 15 obtains the entire image of the target. The field at 16 reflected from target 15 may also be simply stated as being the incident field 13 from the illuminating transmitter multiplied by the reflectivity coefficient from target 15. Different weighting factors may be realized by the different positions of each of the receiving system 20 in the array, with respect to light gradation received from target 15, remembering that the entire target is illuminated and that each receiving system 20 receives a reflected beam covering all points of area of target 15. Thus each receiving system will have a different weighting factor, and the combined inputs of receiving beams 16 are converted by computer 115 to reconstruct the shape and shades of black, gray and white of target 15, when a Matrix such as 200 of receiving systems 20 are utilized.

The computer program utilized is one of the known and published programs in International Business Machine Corp. (IBM) Applications Program (Bulletin GH20-0205-1) for System/360 Scientific Package, Version III of Programmer's Manual for program number 360A-CM-03X, tailored for the FORTRAN language. Within this Program Package, which is the Fifth Edition published August 1970, the subroutine HARM is the program used. The HARM subroutine provides capability slightly in excess of the requirements herein in that it supplies solutions for inverse Fourier transformation by the computer when a three dimensional array is used. Here we have only a two dimensional array, and consequently when the data comprising parameters of two dimensional array are inputted, no data will be provided for the third dimension in which case the computer program HARM at 115' will treat the absence of the third dimensional value as zero, and a true construction of the image on display 120 will result. The HARM program is found in the referenced manual at pages 276–279.

It should be noted that most computers have a memory limited in the number of bits of information or words stored therein. In such case the IBM systems 360 are provided with auxiliary storage capability to take the overflow of information that cannot be stored in the memory within the computer. The auxiliary storage means transfers the data stored therein to the memory in the computer as the computer-stored data is utilized. In this regard the auxiliary system employs memory storage and shift register banks, all known in the art.

CRT display 120 for constructing various shades of black, gray and white to receive computer inputs thereto as 115a by techniques self-contained and used therein are well known in the art. Among the variety of displays 120 made are Princeton Model 801 Graphic Computer Terminal, Instruction 008-2, Issue 1-303, Part No. 18001-0014, made by Princeton Electronic Products, Inc. of North Brunswick, N.J. Another such display tailored to IBM systems 360 computers is made under the trade name of ANAGRAPH by Data Disk of Sunnyvale, Calif. Still another display 141 is made under the trade name of Conographics-12, by Hughes Aircraft Company, Industrial Products Division, Oceanside, Calif.

I claim:

1. An optical target imaging system, comprising in combination:
   a laser transmitter providing a two pulse sequence target illuminating field, one pulse of the two pulse sequence being substantially polarized in one direction and the other of the two pulse sequence being substantially polarized in a direction orthogonal to said one pulse; and
   a plural number of receivers, electromagnetically coupled to the transmitter, for receiving the illuminating field portion reflected from the target, said field portion being of a predetermined polarization state.

2. The invention as stated in claim 1, including:
   a master oscillator optically coupled to the transmitter and providing the operating frequency of the transmitter; and
   an up converter optically coupled to and energized by the master oscillator.

3. The invention as stated in claim 2, including:
   a signal source electrically coupled to and energizing the up converter; and
   a phase shifter electrically coupled to and energized by the signal source.

4. The invention as stated in claim 3, wherein each of the plural number of receivers comprises:
   a polarization selector which receives the illuminating field portion of energy reflected from the target and transmits a portion of said energy.

5. The invention as stated in claim 4, including:
   an optical combiner optically coupled to the polarization selector and the up converter.

6. The invention as stated in claim 5, including:
   a heterodyne detector optically coupled to and energized by optical energy emanating from the combiner.

7. The invention as stated in claim 6, including:
   an intermediate frequency amplifier electrically coupled to the output of the heterodyne detector.

8. The invention as stated in claim 7, including:

first and second synchronous detectors electrically connected to the output of the intermediate frequency amplifier.

9. The invention as stated in claim 8 wherein the signal source is electrically coupled to the first synchronous detector, and wherein the phase shifter is electrically coupled to the second synchronous detector.

10. The invention as stated in claim 9, including:
first and second analog-to-digital converters electrically connected respectively to the first and second synchronous detectors.

11. The invention as stated in claim 10, including:
shift registers electrically connected to the analog-to-digital converters.

12. The invention as stated in claim 11, including:
a digital divider electrically connected to the shift registers.

13. The invention as stated in claim 12, including:
a multiplexer electrically connected to each said digital divider.

14. The invention as stated in claim 13, wherein each of the plural number of receivers includes a telescope the output of which is optically coupled to the polarization selector.

15. The invention as stated in claim 13, wherein the plural number of receivers include a telescope, common to all said receivers, which is optically coupled to the polarization selectors embodied in each of said receivers.

16. The invention as stated in claim 13, including:
means electrically connected to the first and second analog-to-digital converters for transforming intelligence signals in the direct transform form as provided by the analog-to-digital converters to signals in the inverse transform form.

17. The invention as stated in claim 16, including:
a visual display electrically connected to said means.

18. A method for imaging targets through turbulent atmosphere, comprising in combination the steps of:
illuminating at least one of the targets with an encoded electromagnetic wave containing a predetermined pulse sequence;
sampling a received portion of the wave reflected from said at least one of the targets;
converting the received samples to electrical signals;
preserving the phase and amplitude characteristics of the received samples;
analog-to-digitally converting the preserved samples;
forming a two-dimensional array of complex numbers corresponding to and represented by the analog-to-digitally converted preserved samples; and
operationally transforming said formed two-dimensional array to generate another two-dimensional array of complex numbers.

19. The invention as stated in claim 18, including the further step of:
generating a two-dimensional array of real numbers from said another two-dimensional array of complex numbers.

20. The invention as stated in claim 19, including the further step of:
displaying a two-dimensional picture from the generated two-dimensional array of said real numbers to provide a visual display of the target.

21. The invention as stated in claim 18, including the step of feeding the received sampled portions to a plurality of receivers through a common receiving telescope that feeds all said receivers.

22. A method for imaging targets through turbulent atmosphere, comprising in combination the steps of:
illuminating at least one of the targets with an encoded electromagnetic wave containing a predetermined pulse sequence;
sampling a received portion of the wave reflected from said at least one of the targets;
feeding the received sampled portions to a plurality of receivers through an independent receiving telescope associated with each said receiver; and
spacing all receiving telescopes a predetermined distance between each other so that grating lobes associated with the telescope array are controlled so as to miss the edges of the target.

23. A method for imaging targets through turbulent atmosphere, comprising in combination the steps of:
illuminating at least one of the targets with an encoded electromagnetic wave containing a predetermined pulse sequence;
sampling a received portion of the wave reflected from said at least one of the targets;
feeding the received sampled portions to a plurality of receivers through an independent receiving telescope associated with each said receiver; and
controlling grating lobes associated with the telescope array by spacing the receiving telescopes a predetermined distance from each other so as to miss the edges of any of the targets.

* * * * *